United States Patent [19]

Stenzenberger

[11] Patent Number: 4,593,083
[45] Date of Patent: Jun. 3, 1986

[54] CURABLE COMPOSITION COMPRISING BISMALEIMIDE AND MALEIMIDE-AMIDE

[75] Inventor: Horst D. Stenzenberger, Schriesheim, Fed. Rep. of Germany

[73] Assignee: The Boots Company PLC, England

[21] Appl. No.: 630,664

[22] Filed: Jul. 13, 1984

[51] Int. Cl.[4] ............................................. C08F 22/40
[52] U.S. Cl. .................................... 526/262; 428/441;
428/500; 524/548; 525/47; 525/169; 525/326.7;
526/265; 526/278; 526/279; 528/322
[58] Field of Search ............... 526/262, 265, 278, 279;
524/548

[56] References Cited

U.S. PATENT DOCUMENTS 2,706,720  4/1955  Caldwell ............................. 526/262
4,320,217  3/1982  D'Alelio et al. .................... 526/262

Primary Examiner—Harold D. Anderson
Attorney, Agent, or Firm—Robert J. Koch

[57] ABSTRACT

Curable bisimide resin compositions containing 4,4'-bis-maleimidodiphenylmethane, 1 to 20% of a compound of formula I

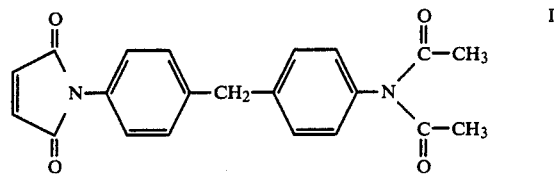

and optionally 2 to 20% of a compound of formula II

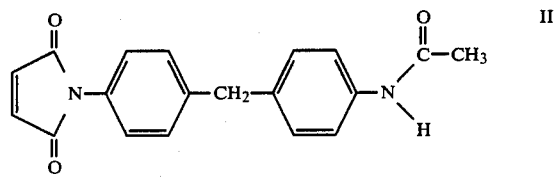

may be used in solution or as melts to produce fibre-reinforced resins.

30 Claims, No Drawings

CURABLE COMPOSITION COMPRISING BISMALEIMIDE AND MALEIMIDE-AMIDE

BACKGROUND OF THE INVENTION

The present invention relates to curable bisimide resin compositions. The curable bisimide resin compositions of the present invention may be used for the production of fibre reinforced resins. For this application it is one possibility to prepare the resin composition in the form of a solution which is used to impregnate fibrous materials. It is advantageous to prepare the bisimide impregnating solutions with as large a bisimide content as possible. However bisimide compounds such as 4,4'-bismaleimidodiphenylmethane have limited solubility in the commonly used solvents and this limits the concentrations which can be employed. Another possibility for the impregnation of reinforcing fibres is to use molten resins. However, bismaleimides such as 4,4'-bismaleimidodiphenylmethane show a high tendency to crystallize and therefore do not provide stable melts at low temperatures.

It is one object of the present invention to provide solutions of curable bisimide resin compositions for use in the production of fibre reinforced resins in which as high a concentration as possible of 4,4'-bismaleimidodiphenylmethane is present. It is another object of this invention to provide curable bisimide resin compositions for use in the production of fibre reinforced materials in the form of a stable non-crystallizable melt in which as high a proportion as possible of 4,4'-bismaleimidodiphenylmethane is present.

SUMMARY OF THE INVENTION

The present invention provides curable bisimide resin compositions which comprise 4,4'-bismaleimidodiphenylmethane and from 1 to 20% by weight of the weight of the 4,4'-bismaleimidodiphenylmethane of a compound of formula I

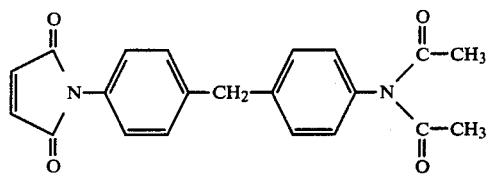

The use of the curable bisimide resin compositions of the present invention enables solutions or melts of 4,4'-bismaleimidodiphenylmethane to be prepared in which a higher concentration of 4,4'-bismaleimidodiphenylmethane is present.

The curable bisimide resin compositions of the present invention may additionally comprise 2 to 20% by weight of the weight of the 4,4'-bismaleimidodiphenylmethane of a compound of formula II

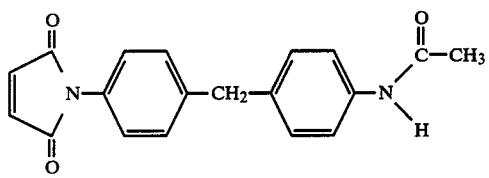

The curable bisimide resin compositions of the present invention may also contain one or more additional bisimides of formula III

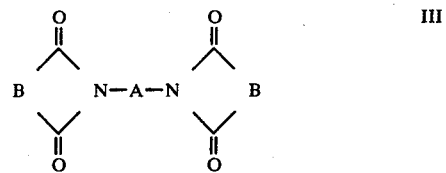

in which B is a bivalent radical containing a carbon-carbon double bond and A is a bivalent radical having at least two carbon atoms.

The radical designated A in general formula I may be (a) an alkylene group with up to 12 carbon atoms, (b) a cycloalkylene group with 5 to 6 carbon atoms, (c) a heterocyclic group with 4 to 5 carbon atoms and at least one nitrogen, oxygen or sulphur atom in the ring, (d) a mono or dicarbocyclic group or (e) at least two mono or dicarbocyclic aromatic or cycloalkylene groups which are connected to one another by a direct carbon-carbon bond or by a bivalent group chosen from oxygen, sulphur, alkylene with one to three carbon atoms, or a group of formula IIIa to IIIj

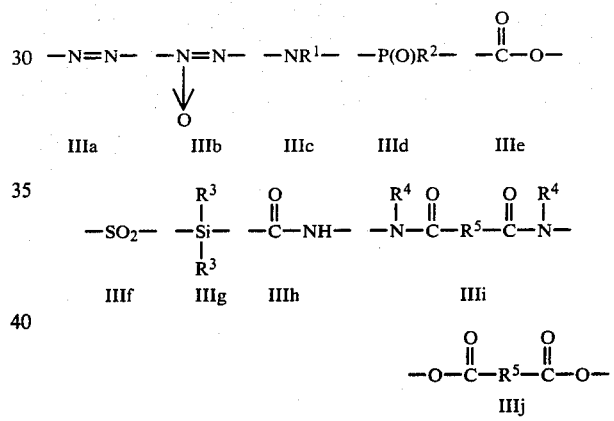

the radicals $R_1$, $R_2$, $R_3$, $R_4$, being alkyl groups with one to five carbon atoms, $R_5$ being an alkylene group or an arylene group.

The radical B in the general formula I represents a divalent organic radical containing a carbon-carbon double bond. The radical B may have a structure as shown in formula IV, V, VI or VIII

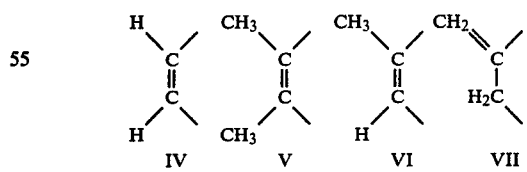

Bismaleimides of formula I in which the radical B is of formula IV may be used for producing the new imide resins. Examples of suitable bismaleimides are 1,2-bismaleimidoethane, 1,6-bismaleimidohexane, 1,12-bismaleimidododecane, 1,6-bismaleimido-(2,2,4-trimethyl)hexane, 1,3-bismaleimidobenzene, 1,4-bismaleimidobenzene, 4,4'-bismaleimidodiphenylmethane, 4,4'-bismaleimidodiphenylether, 4,4'-bismaleimidodiphenylsulphide, 4,4'-bismaleimidodiphenylsulphone, 4,4'-bismaleimidodicyclohexylmethane, 2,4-bismaleimidotoluene, 2,6-bismaleimidotoluene, N,N'-m-xylylenebismaleimide, N,N'-p-xylylenebismaleimide. Examples of other suitable bisimides are N,N'-m-phenylene-bis-citraconomide and N,N'-4,4'-diphenylmethane-citraconimide, in which the radical B is of formula VI and N,N'-4,4'-diphenylmethane-bis-itaconomide in which the radical B is of formula VII.

The curable bisimide resin compositions of the present invention may also contain other monomers which are not bisimides but which are copolymerisable with the bisimide polymers present. Examples of suitable comonomers are diamines (See U.S. Pat. No. 3,562,223), dihydrazides (See U.S. Pat. No. 4,211,860), amino acid hydrazides (See U.S. Pat. No. 4,211,861), azomethines (See U.S. Pat. No. 3,944,525) and polyisocyanates (See British Patent Application No. 2125806).

The preparation of the new curable bisimide resins can be carried out in an inert organic solvent or diluent, for example in dimethyl formamide, dimethylacetamide, N-methyl pyrrolidone and tetramethyl urea, or ketone type solvents such as acetone, methyl-ethyl ketone, methyl isobutyl ketone and cyclohexanone or chlorinated solvents such as methylene chloride, ethyl chloride, 1,2-dichloroethane and ether-type solvents such as dioxane, tetrahydrofuran ethyl glycol and ester type solvents such as ethyl acetate or mixed glycol ether-esters such as ethyl glycol acetate, methyl glycol acetate, diethylene glycol diethyl ether, diethylene glycol monoethyl ether acetate etc. in such a manner that prepolymer solutions are obtained. The prepolymer can be isolated by stripping off the solvent either in vacuum or by heat or both, thus providing a solventless resin that can be used to prepare impregnating solutions or melts.

The preparation of the new curable bisimide resin compositions may be performed by using conventional techniques for mixing and grinding of powders or powders and liquids to intimately blend the bisimides with any other components of the resin composition. Prepolymers are obtained by heating the homogeneous mixture at a temperature between 80° and 200° C., for sufficient time to produce a still formable and soluble product which is then used to produce impregnating solutions or melts.

The production of the new curable bisimide resin compositions according to this invention may also be carried out in inert diluents in which only one or some of the starting materials is or are completely soluble or in which all the starting components are completely soluble. The latter procedure is preferred for the production of prepregs.

For many industrial applications of the new curable bisimide resin compositions of the present invention, it is advantageous to accelerate the curing process by adding catalysts. Effective curing catalysts are organic peroxides such as ditertiary butyl peroxide, diamyl peroxide, t-butyl perbenzoate in the concentration of 0.05 to 0.5% in relation to the total weight of the curable bisimide resin compositions. Other catalysts that may be used are tertiary amines like N,N'-dimethylaniline, N,N'-dimethyl-benzylamine, N-methylmorpholine, tri-n-butylamine, tri-methylamine and azabicyclooctane and others.

The catalysts can be admixed with the components of the curable bisimide resin compositions or they may be added during the production of the prepolymers either by a powder blending process or by the solvent blending process described above.

The curable bisimide resin compositions of the present invention may also comprise reactive diluents. Suitable reactive diluents which may be employed carry one or more polymerizable double bonds of the general formula VIII

$$CH_2=C\diagup_{\diagdown}$$ VIII and may be of the vinyl-, allyl- or acryl-type. These reactive diluents can be of the ether, ester, hydrocarbon or heterocyclic type. Typical ethers that may be employed are vinylallylether, diallylether, methallylether and vinylphenylether. Typical esters are vinyl-, allyl-, methylallyl-, 1-chloroallyl-, crotyl-, isopropenyl esters derived from saturated or unsaturated aliphatic or aromatic mono- or polycarboxylic acids such as formic, acetic, propionic, butyric, oxalic, malonic, adipic, sebacic, acrylic, methacrylic, phenylacrylic, crotonic, maleic, fumaric, itaconic, citraconic, tetrahydrophthalic, benzoic, phenylacetic, o-phthalic, isophthalic or terephthalic acid and naphthalic-dicarboxylic acid or mixtures thereof. The most important hydrocarbon type reactive diluents to be used are styrene, methylstyrene, vinylhexane, vinylcyclohexane, divinylbenzene, divinyl cyclohexane, diallybenzene, vinyltoluene and 1-vinyl-4-ethyl-benzene or mixtures thereof. Examples of heterocyclic type reactive diluents are vinylpyridine and vinylpyrrolidine.

In those cases where reactive diluents are used it is possible to first blend the bisimide components with the reactive diluent and then add any additional components of the curable bisimide resin composition. The quantity of reactive diluent that may be employed can be up to 80% by weight of the total curable resin composition.

Very advantageous reactive diluents are styrene and divinylbenzene which are used in quantities up to 30% of the total bisimide mixture. Care has to be taken with these diluents because they crosslink at very low temperatures, at around 100°–110° C., therefore mixtures containing these diluents have to be prepared at temperatures well below 100° C.

The curable bisimide resin compositions of the present invention can be further modified with unsaturated polyester resins. Useful unsaturated polyesters are well known products which are prepared by polycondensation of polycarboxylic acid derivatives such as esters with polyglycols as described in detail in Kunststoffhandbuch, Band VII, p. 247–282, Carl Hanser Verlag, Munchen 1973. Solutions of these polyesters in the reactive diluents described above can be used instead of the reactive diluent alone to modify the new curable bisimide resin compositions.

The curable bisimide resin compositions of the present invention may also contain as co-reactants carboxy-terminated polybutadiene/acrylonitrile copolymers of formula IX

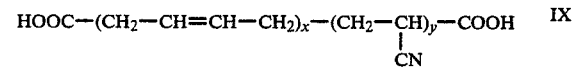

wherein the ratio of x to y lies in the range 99:1 to 65:35. The carboxy-terminated polybutadiene/acrylonitrile which may be employed, are commercially available (Hycar from B. F. Goodrich):, they are liquid or solid at room temperature, depending on their molecular weight. Hycar 1300X8, which is a very useful modifier, is liquid at room temperature and has an acrylonitrile content of about 17%.

The carboxy-terminated polybutadiene/acrylonitrile copolymers may be blended with the curable maleimide resins either in the molten form or via solution techniques. Low molecular weight liquid rubbers are preferably blended in the molten stage, at temperatures where the maleimide is a low-viscosity melt. The elastomeric modifiers may be used in quantities up to 100% based on the amount of maleimide resin present.

Solutions of the curable bisimide resin compositions of the present invention may be used to produce fibre-reinforced laminated materials. These solutions may be prepared as described above or may be prepared when the prepolymers produced from the curable bisimide resin compositions are dissolved in suitable solvents to provide a 25–65% preferably a 50–60% by weight solution, which is used to impregnate glass fibres in the form of fabrics or rovings or carbon fibres or boron fibres or organic synthetic fibres in the form of fabrics, filaments or rovings are impregnated with this solution and then stripped of the solvent by drying after which they are moulded into laminate form by the application of pressure and temperature.

Examples of suitable solvents for the production of impregnating solutions are acetic acid esters, preferably methylacetate and ethylacetate, or ether-type solvents like tetrahydrofuran, dioxan, ethyleneglycoldiethylether, ethyleneglycoldimethyl ether, diethyleneglycoldimethylether, diethyleneglycolmonoethylether, or mixtures of the said solvents, also ketone-type solvents like acetone, methyl-ethyl ketone and aromatic hydrocarbons like toluene and xylene, preferably used in mixtures with the ketone-type solvents, may be employed. Also highly polar solvents like dimethylformamide, dimethylacetamide and N-methylpyrrolidone may be used.

To prepare melts which may be used to produce fibre-reinforce laminated materials, the curable bisimide resin compositions of the present invention in solid form are heated to a temperature at which they are molten but at which no appreciable amount of curing occurs. The molten curable resin is then applied to the fibre reinforcement in a known manner prior to the final curing of the resin.

DESCRIPTION OF PREFERRED EMBODIMENTS

The invention will be illustrated by the following non-limiting Examples which are given by way of example only.

EXAMPLE 1

Preparation of 4,4'-bismaleimidodiphenylmethane, 4-acetylamino-4'-maleimidodiphenylmethane, 4-diacetylamino-4'-maleimidodiphenylmethane mixture.

141.8 g Dry dimethylformamide, 59.5 g methylenedianiline and 8.61 g sodium acetate are charged into a 3-necked reactor equipped with a stirrer and reflux condenser. To this mixture 58.6 g maleic acid anhydride are added over a period of 30 minutes with cooling so that the reaction temperature does not exceed 60° C. To the reaction mixture 70.2 g acetic anhydride are added in such a way that the temperature does not exceed 60°–65° C., and finally the reaction mixture is stirred for 140 minutes at 60° C. 13.6 ml Water is added within 15 minutes and then 248 ml water is added while stirring over a period of 30 minutes to precipitate the product. The material is separated by filtration and is washed with a water-methanol mixture (50 ml) and dried at 70° C. in a circulating air oven. The material is analysed by use of high pressure liquid chromatography showing the existence of the following compounds:

| | |
|---|---|
| 4,4'-bismaleimidodiphenylmethane | 75% |
| 4-acetylamino-4'-maleimidodiphenylmethane | 8% |
| 4-diacetylamino-4'-maleimidodiphenylmethane | 16% |
| minor impurities | 1% |

The maleimide resin mixture is preferably employed as such without isolation of the individual maleimide compounds as described in the following examples.

It is also possible to isolate the individual maleimide compounds by means of chromatography employing a silica gel column.

The individual maleimides show the following melting points:

| | |
|---|---|
| 4,4'-bismaleimidodiphenylmethane | mp 154–156° C. |
| 4-acetylamino-4'-maleimidodiphenylmethane | mp 165–167° C. |
| 4-diacetylamino-4'-maleimidodiphenylmethane | mp 143–145° C. |

EXAMPLE 2

The maleimide resin material prepared in Example 1 (56 g) which contains 42.5 g 4,4'-bismaleimidodiphenylmethane, 4.5 g 4-acetylamino-4'-maleimidodiphenylmethane and 9.0 g 4-diacetylamino-4'-maleimidodiphenylmethane is blended with 24 g 2,4-bis-maleimidotoluene and 20 g 1,6-bismaleimido(2,2,4-trimethyl)hexane in the presence of toluene as a diluent, and heated to 125° C., while stripping off the diluent. At 120° C., a low-viscosity molten curable maleimide resin is obtained, which after cooling to room temperature is solid at room temperature.

The curable maleimide resin when heated to 80° C., shows no tendency to crystallize and can be blended with other modifiers as described in the following Examples. The resin can also be dissolved in low-boiling solvents such as acetone and methylene chloride, and thus can be blended with diluents and modifiers via solution techniques.

EXAMPLE 3

100 g of the resin prepared in Example 2 is blended with 10 g 4,4'-diaminodiphenylsulfone and 2.2 g 4,4'-diaminodiphenylmethane at a temperature of 110° C. The resulting modified resin can be processed in a similar way to the resin described in Example 5.

EXAMPLE 4

112 g of the maleimide resin material prepared as described in Example 1 is dissolved in 120 g N-methylpyrrolidone by heating the mixture to a temperature of 80°–90° C. After cooling, 14 g isophthalic acid dihydrazide is added to the solution, and the mixture is again heated to a temperature of 100° C. for 1 hour. The resin solution obtained after cooling to room temperature is used to impregnate glass fabric of the type G 92111/A 1100 from the firm Interglas, Ulm, West Germany. Glass fabric squares (15×15) are immersed in the resin solution to be impregnated homogeneously with resin and are then dried at 140° C. in a circulating air oven. The prepregs thus obtained are stacked between aluminium foils in a heated platen press, and cured at a temperature of 170° C. for 3 hours, employing a pressure of 40 bars. The resulting laminate is postcured at 240° C. for 15 hours, providing the following properties:

| Resin content | 32% by weight |
| Density | 1.94 g/cm$^2$ |
| Flexural strength | 625 N/mm$^2$ at 25° C. |
| Flexural modulus | 24.5 kN/mm$^2$ at 25° C. |
| Interlaminar shear strength | 62 N/mm$^2$ at 25° C. |

EXAMPLE 5

A mixture of 112 g of the maleimide resin material prepared in Example 1, 48 g 2,4-bismaleimidotoluene, 20 g 1,6-bismaleimido(2,2,4-trimethyl)hexane and 10 g 3-aminobenzoic acid hydrazide is dissolved in methylethyl ketone to form a 65% by weight resin solution. This impregnation varnish is used to impregnate carbon fibres of the type Thornel 300/3000 of Messrs. Torayca, Japan. A unidirectional carbon fibre prepreg is prepared, employing a filament winding process. The resin content is adjusted to be 40% by weight and the residual solvent content (volatiles) is adjusted to be less than 3% by weight by drying the prepreg at 50°–60° C.

The prepreg is moulded to an 18-layer unidirectional laminate, employing a low-pressure autoclave moulding technique, the prepreg being stacked between release fabric in a sealed vacuum bag. The maximum pressure employed is 4 bars, and cure is performed at 180° C. over a period of 4 hours. After demoulding, the laminate is postcured for 15 hours at 240° C.

| Property | Unit | Temperature | Value measured |
|---|---|---|---|
| Fibre content | volume % | 25° C. | 60 |
| Density | g/cm$^3$ | 25° C. | 1.60 |
| Flexural strength | N/mm$^2$ | 25° C. | 1919 |
|  |  | 250° C. | 1345 |
| Flexural modulus | kN/mm$^2$ | 25° C. | 113 |
|  |  | 250° C. | 114 |
| Interlaminar shear strength | N/mm$^2$ | 25° C. | 121 |
|  |  | 250° C. | 60 |

EXAMPLE 6

A mixture of 112 g of the maleimide resin material prepared as described in Example 1, 48 g 2,4-bismaleimidotoluene, 10 g 1,6-bismaleimido(2,2,4-trimethyl)hexane, 5 g amino-benzoic acid hydrazide and 5 g of a macrodiisocyanate (MI) are blended in a mixture of toluene (500 ml) and ethanol (500 ml). The temperature of the mixture is raised to 110° C. and toluene and ethanol simultaneously stripped off, providing a viscous resin melt.

The resin (150 g) is dissolved in 150 g of an acetone-methylglycolacetate mixture as a solvent at room temperature, and the resulting impregnation varnish is used to prepare glass fabric prepregs. Glass fabric squares (15×15 cm$^2$) are immersed in the resin solution thus being impregnated homogeneously, providing after drying out a circulating air over at 80° C. for 30 minutes, prepregs with a dry resin content of 35% by weight.

The layers of glass fabric prepreg are cured in an autoclave, employing the low-pressure autoclave moulding techniques. The prepreg stack is sandwiched between release fabric in a sealed vacuum bag and cured in the autoclave at a temperature of 175° C. for 3 hours, employing a pressure of 4 bars. After demoulding, the laminate is postcured at 240° C. for 12 hours, providing the following properties:

| Resin content | 43% by weight |
| Density | 1.87 g/cm$^3$ |
| Flexural strength at 25° C. | 496 N/mm$^2$ |
| Flexural strength at 250° C. | 445 N/mm$^2$ |
| Flexural modulus at 25° C. | 16.77 kN/mm$^2$ |
| Flexural modulus at 250° C. | 16.00 kN/mm$^2$ |
| Short beam shear strength at 25° C. | 40 N/mm$^2$ |
| Short beam shear strength at 250° C. | 37 N/mm$^2$ |

Preparation of the macrodiisocyanate (MI):

350 g 4,4'-diisocyanatodiphenylmethane and 821 g tetramethylene glycol (molecular weight 1000) are stirred and heated in a round bottomed flask under nitrogen gas at a temperature of 85° C. for 1.5 hours, providing a macroisocyanate showing an isocyanate content of $1.10^{-3}$ mols.g$^{-1}$.

EXAMPLE 7

A resin consisting of 56 g of the maleimide resin material prepared as described in Example 1, 24 g 2,4-bismaleimidotoluene and 20 g of a commercially available vinylester (DERAKANE 200 from DOW Chemicals) is prepared by blending the said constituents in the presence of toluene at a temperature of 100°–110° C. The diluent (toluene) is stripped off in vacuum at 110° C. to provide a resin showing the following properties:

| Gel time at 170° C. | 35 minutes |
| Viscosity at 190° C. | 730 mPa.s$^{-1}$ |
| Heat of polymerization | 244 J/g |

The said resin can be cured in a steel mould under pressure at 210° C. to form a cured resin with outstanding high temperature properties. The resin forms a moderately stable 50% by weight solution from which solution prepregs can be prepared via the dip-coating technique.

EXAMPLE 8

A resin consisting of 28 g of the maleimide resin material prepared as described in Example 1 12 g 2,4-bismaleimidotoluene and 10 g of the vinylester (Derakane 200) prepared via the process described in Example 8 is blended with 50 g polyesterimide (Dobekane FT 3018) dissolved in 15 g triallylcyanurate containing 1% 2,5-dimethylhexane-2,5-di-t-butylperoxide as a peroxide catalyst at a temperature of 80° C., such that a homogeneous melt is obtained.

The resin is cast into a steel mould and cured for 1 hour at 150° C., followed by a 20 hours cure at 170° C.

Properties of cured resin:

| Density | 1.25 g/cm$^3$ |
| Flexural strength at 20° C. | 83.7 N/mm$^2$ |
| Flexural strength at 150° C. | 37.3 N/mm$^2$ |

| | |
|---|---|
| Flexural modulus at 20° C. | 4.37 kN/mm² |
| Flexural modulus at 150° C. | 2.16 kN/mm² |

EXAMPLE 9

100 g of the resin prepared as described in Example 2 is blended at 90°–95° C. with 21.5 g of a commercially available polyester imide (Dobekane FT 3018) and 21.5 g of a technical grade divinylbenzene, which is a mixture of 1,4-divinylbenzene (50%), vinyl-ethylbenzene (50%) and traces of diethylbenzene, stirred for 15 minutes until a homogeneous mixture is obtained. The resin is cast when hot in a mould, and cured for 45 minutes at 110° C., 1 hour at 125° C. and 1 hour at 160° C. After demoulding, the 4 mm thick plates is postcured at 240° C. for 15 hours and shows the following properties:

| | |
|---|---|
| Density | 1.28 g/cm³ |
| Flexural strength at 20° C. | 95 N/mm² |
| Flexural strength at 250° C. | 79 N/mm² |
| Flexural modulus at 20° C. | 4.10 kN/mm² |
| Flexural modulus at 250° C. | 2.75 kN/mm² |

EXAMPLE 10

A mixture of 56 g of the maleimide resin material prepared as described in Example 1, 24 g 2,4-bis-maleimidotoluene and 30 g of an unsaturated polyesterimide (Dobekane FT 3085, Messrs. Beck, Hamburg) are blended in the presence of toluene (80 g) as a diluent at a temperature of 110° C. During the blending operation, the toluene is stripped off and the mixture is then cooled down to 90° C., at which temperature 10 g of diallylphthalate containing 0.25 g diazabicyclooctane is added and homogeneously admixed. The resin is cast into a parallel epipedic mould and cured at a temperature of 190° C. for 4 hours under a pressure of 4 bars. After postcure at 210° C. for 15 hours, the following properties are obtained:

| | |
|---|---|
| Density | 1.31 g/cm³ |
| Flexural strength at 20° C. | 103 N/mm² |
| Flexural strength at 250° C. | 27 N/mm² |
| Flexural modulus at 20° C. | 4.28 kN/mm² |
| Flexural modulus at 250° C. | 1.51 kN/mm² |

EXAMPLE 11

A mixture of 56 g of the maleimide resin material prepared as described in Example 1, 24 g 2,4-bis-maleimidotoluene and 30 g of an unsaturated polyesterimide (Dobekane FT 3085, Messrs. Beck, Hamburg) are blended in the presence of toluene as a diluent at a temperature of 110° C. During the blending operation, the toluene is stripped off and the mixture is cooled down to 90° C., at which temperature a 10 g triallylcyanurate containing 0.5 g diazabicyclooctane is added and homogeneously admixed. The resin thus obtained is cast into a parallel epipedic mould and cured under a pressure of 4 bars at a temperature of 190° C. for 4 hours. The plates obtained are postcured for 15 hours at 210° C. The cured material shows the following mechanical properties:

| | |
|---|---|
| Density | 1.31 g/cm³ |
| Flexural strength at 20° C. | 95 N/mm² |
| Flexural strength at 250° C. | 34 N/mm² |
| Flexural modulus at 20° C. | 4.12 kN/mm² |
| Flexural modulus at 250° C. | 1.91 kN/mm² |

EXAMPLE 12

100 g of the resin prepared as described in Example 2 is blended with 50 g of a carboxy-terminated acrylonitrile-butadiene copolymer (Hycar 1300X8, commercially available from B. F. Goodrich) for 8 hours at 120° C. The molten resin mixture is poured into a steel mould at 120°–140° C. and then cured at 190° C. for 16 hours, employing a pressure of 5 bars. After demoulding, the plate obtained is postcured at 210° C. for 12 hours. The cured resin shows the following properties:

| | |
|---|---|
| Density | 1,6 |
| Flexural strength at 20° C. | 87 N/mm² |
| Flexural strength at 150° C. | 45.8 N/mm² |
| Flexural strength at 250° C. | 30 N/mm² |
| Flexural modulus at 20° C. | 3.26 kN/mm² |
| Flexural modulus at 150° C. | 1.91 kN/mm² |
| Flexural modulus at 250° C. | 1.42 kN/mm² |

EXAMPLE 13

100 g of the resin prepared as described in Example 2 is blended at 110° C. with 5 g of tri-allylisocyanurate until a homogeneous melt is obtained. The molten mixture is cooled to 80°–90° C. and then 20 g of technical grade divinylbenzene which is a mixture of 1,4-divinylbenzene (50%), vinyl ethyl benzene (50%) and traces of diethylbenzene are added. The resin is cast into a preheated parallel epipedic mould and cured for 2 hours at 90° C., for 2 hours at 180° C. and then for 2 hours at 210° C. After demoulding and post-curing at 240° C. for ten hours the resin shows the following properties.

| | |
|---|---|
| Density | 1.28 g/cm³ |
| Flexural strength at 25° C. | 122 N/mm² |
| Flexural strength at 250° C. | 91 N/mm² |
| Flexural modulus at 25° C. | 3.45 kN/mm² |
| Flexural modulus at 250° C. | 2.43 kN/mm² |

I claim:

1. Curable bisimide resin composition comprising 4,4'-bismaleimidodiphenylmethane and from 1 to 20% by weight of the weight of the 4,4'-bismaleimidodiphenylmethane of a compound of formula I

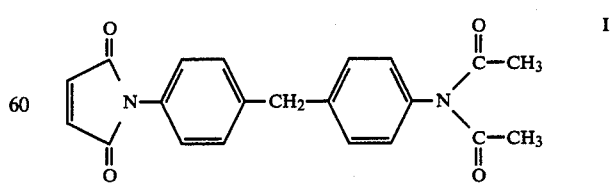

2. Curable bisimide resin composition as claimed in claim 1 additionally comprising 2 to 20% by weight of the weight of the 4,4'-bismaleimidodiphenylmethane of a compound of formula II

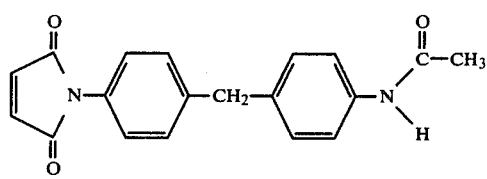

II

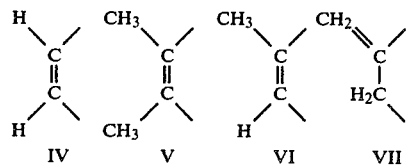

3. Curable bisimide resin composition as claimed in claim 1 additionally comprising one or more bisimides of formula III

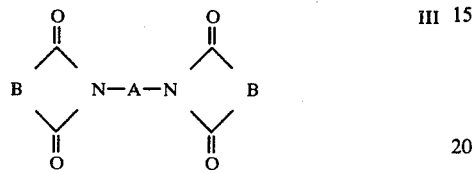

III in which B is a divalent radical containing a carbon-carbon double bond and A is a bivalent radical having at least two carbon atoms.

4. Curable bisimide resin composition according to claim 3 in which the bisimide of the general formula III is characterised in that A is a member selected from the groups consisting of
(a) an alkylene group with up to 12 carbon atoms,
(b) a cycloalkylene group with 5 to 6 carbon atoms,
(c) a heterocyclic group with 4 to 5 carbon atoms and at least one nitrogen, oxygen or sulphur atom in the ring, (d) a mono or dicarbocyclic group, (e) at least two mono or dicarbocyclic aromatic or cycloalkylene groups which are connected to one another by a direct carbon-carbon bond or by a bivalent group chosen from oxygen, sulphur, alkylene with one to three carbon atoms, or (f) a group of formulae IIIa to IIIj

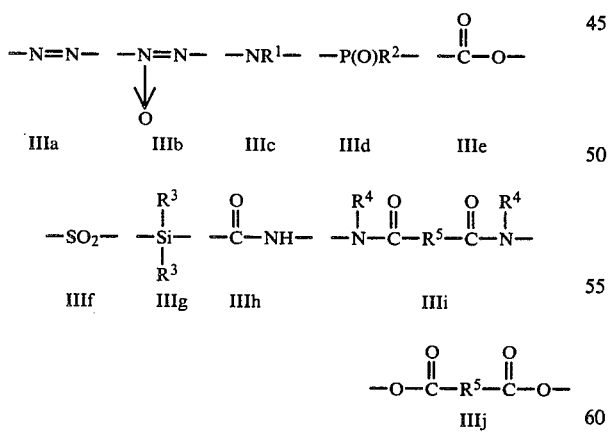

the radicals $R_4$, $R_5$, $R_6$, $R_7$, being alkyl groups with one to five carbon atoms, $R_8$ being an alkylene group or an arylene group and B is a group which is capable of addition polymerization selected from a group of formula IV, V, VI or VII

5. Curable resin composition as claimed in claim 1 containing a reactive diluent which carries at least one polymerizable double bond of the general formula VIII $$CH_2{=}C{\diagdown\atop\diagup}$$ VIII of the vinyl-, allyl- or acryl-type.

6. Curable bisimide resin composition as claimed in claim 5 in which the reactive diluent is one of the following compounds or mixtures thereof: styrene, methylstyrene, vinyltoluene, divinylbenzene, vinylcyclohexane, divinylcyclohexane, vinylpyridine, vinylpyrrolidone.

7. Curable resin composition as claimed in claim 5 wherein the reactive diluent is present in quantities up to 80% of the total final resin mixture by weight.

8. Curable resin composition as claimed in claim 7 wherein the reactive diluent is styrene or divinylbenzene, the reactive diluent being present in quantities up to 30% of the total final resin mixture by weight.

9. Curable resin composition as claimed in claim 1 containing curing catalyst selected from one of the following compounds:
ditertiary butyl peroxide,
diamyl peroxide,
t-butyl perbenzoate,
N,N'dimethylbenzylamine,
N,N'dimethyl aniline,
N-methylmorpholine,
tri-n-butylamine,
tri-methylamine or
azabicyclooctane.

10. Curable resin composition as claimed in claim 9 wherein a peroxide catalyst is present in the concentration of 0.05 to 1.5% of the total final resin mixture by weight.

11. Prepolymer obtained by heating the curable resin composition as claimed in claim 1 to temperatures of between 80° and 200° C. for a time sufficient to obtain a still formable product.

12. Prepolymer as claimed in claim 11 wherein a catalyst is used and the resin mixture is in the melt form or in solution.

13. Solution of curable resin composition as claimed in claim 1 in an inert organic solvent selected from dimethylformamide, dimethylacetamide, N-methyl pyrrolidone, tetramethyl urea, acetone, methyl-ethyl ketone, methyl-isobutyl ketone, cyclohexanone, methylene chloride, ethyl chloride, 1,2-dichloroethane, dioxan, tetrahydrofuran, ethyl glycol, ethyl acetate, ethyl glycol acetate, methyl glycol acetate, diethyleneglycol diethyl ether, diethyleneglycol monoethyl ether acetate and mixtures thereof.

14. Solution according to claim 13 suitable for producing laminates in which the resin is present in a concentration of 25 to 65% of the solution by weight.

15. Solution according to claim 13 suitable for producing laminates in which the resin is present in a concentration of 50 to 60% of the solution by weight.

16. Crosslinked polymer derived by heating the curable resin composition of claim 1 to temperatures of between 80° and 400° C. for a time sufficient to complete cure.

17. Crosslinked polymer derived by heating the prepolymer of claim 11 to temperatures of between 80° and 400° C. for a time sufficient to complete cure.

18. Film cast from a solution of curable resin composition as claimed in claim 13.

19. Article formed under heat and pressure from the curable resin composition claimed in claim 1.

20. Article formed under heat and pressure from the prepolymer claimed in claim 11.

21. A laminated article formed from the composition of claim 1.

22. Fibrous material impregnated with a curable resin composition as claimed in claim 1.

23. Fibrous material impregnated with a prepolymer as claimed in claim 11.

24. Fibrous material impregnated with a solution as claimed in claim 17.

25. Impregnated material as claimed in claim 22 in which the fibrous material is roving, fabric, mat or felt.

26. Impregnated material as claimed in claim 23 in which the fibrous material is roving, fabric, mat or felt.

27. Impregnated material as claimed in claim 24 in which the fibrous material is roving, fabric, mat or felt.

28. Article formed under heat and pressure from the impregnated fibrous material as claimed in claim 22.

29. Article formed under heat and pressure from the impregnated fibrous material as claimed in claim 23.

30. Article formed under heat and pressure from the impregnated fibrous material as claimed in claim 24.

* * * * *

UNITED STATES PATENT AND TRADEMARK OFFICE
CERTIFICATE OF CORRECTION

PATENT NO. : 4,593,083

DATED : June 3, 1986

INVENTOR(S) : Stenzenberger

It is certified that error appears in the above-identified patent and that said Letters Patent is hereby corrected as shown below:

In the Specification:

Column 2, line 26, delete "formula" and insert therfor --formulae--.

In the Claims:

Column 11, Line 41, delete "(f)".

Signed and Sealed this

Twenty-fourth Day of March, 1987

Attest:

DONALD J. QUIGG

Attesting Officer     Commissioner of Patents and Trademarks